(12) United States Patent
Rilbe et al.

(10) Patent No.: US 7,264,129 B2
(45) Date of Patent: Sep. 4, 2007

(54) DEVICE FOR SLEWING THE COLUMN OF A CRANE

(75) Inventors: Ulf Rilbe, Vasteras (SE); Jan Palmcrantz, Harmanger (SE)

(73) Assignee: Rilbe & Co. HB, Vasteras (SE)

( * ) Notice: Subject to any disclaimer, the term of this patent is extended or adjusted under 35 U.S.C. 154(b) by 388 days.

(21) Appl. No.: 10/868,944

(22) Filed: Jun. 17, 2004

(65) Prior Publication Data

US 2005/0011848 A1 Jan. 20, 2005

(30) Foreign Application Priority Data

Jun. 17, 2003 (SE) .................................... 0301748

(51) Int. Cl.
*B66C 23/84* (2006.01)
(52) U.S. Cl. ...................... 212/247; 212/253
(58) Field of Classification Search ................ 212/247, 212/253
See application file for complete search history.

(56) References Cited

U.S. PATENT DOCUMENTS

| 3,369,672 A | 2/1968 | Lorence |
| 3,861,243 A | 1/1975 | Fleischer et al. |
| 3,960,285 A | 6/1976 | Gano |
| 5,704,865 A | 1/1998 | Rennerfelt |
| 5,913,744 A | 6/1999 | Rennerfelt |

FOREIGN PATENT DOCUMENTS

| DE | 956 882 | 1/1957 |
| DE | 19 29 056 | 12/1970 |
| GB | 1 232 355 | 5/1971 |
| SE | 501 463 | 2/1995 |
| SE | 502 228 | 9/1995 |
| SU | 785181 | 12/1980 |

*Primary Examiner*—Thomas J. Brahan
(74) *Attorney, Agent, or Firm*—Young & Thompson

(57) ABSTRACT

The invention relates to a device dedicated for slewing a crane column, which device comprises a fastenable crane base formed by a house which is open at the top and at the bottom and in which a lower tubular part of the crane column is rotatably journalled by means of a number of bearings, which have the abilities of absorbing the bending moment as well as the axial and-/or transversal forces. A power source is connected to the crane column via a power slewing in order to provide for a powered rotation of the crane column around a vertical axis of rotation. Characterizing for the invention is that the power transmission comprises an eccentric gear, which is integrated with the house by being seated in an annular space between the outside of the crane column and the inside of the house.

3 Claims, 3 Drawing Sheets

DEVICE FOR SLEWING THE COLUMN OF A CRANE

TECHNICAL FIELD OF THE INVENTION

Figure 1:
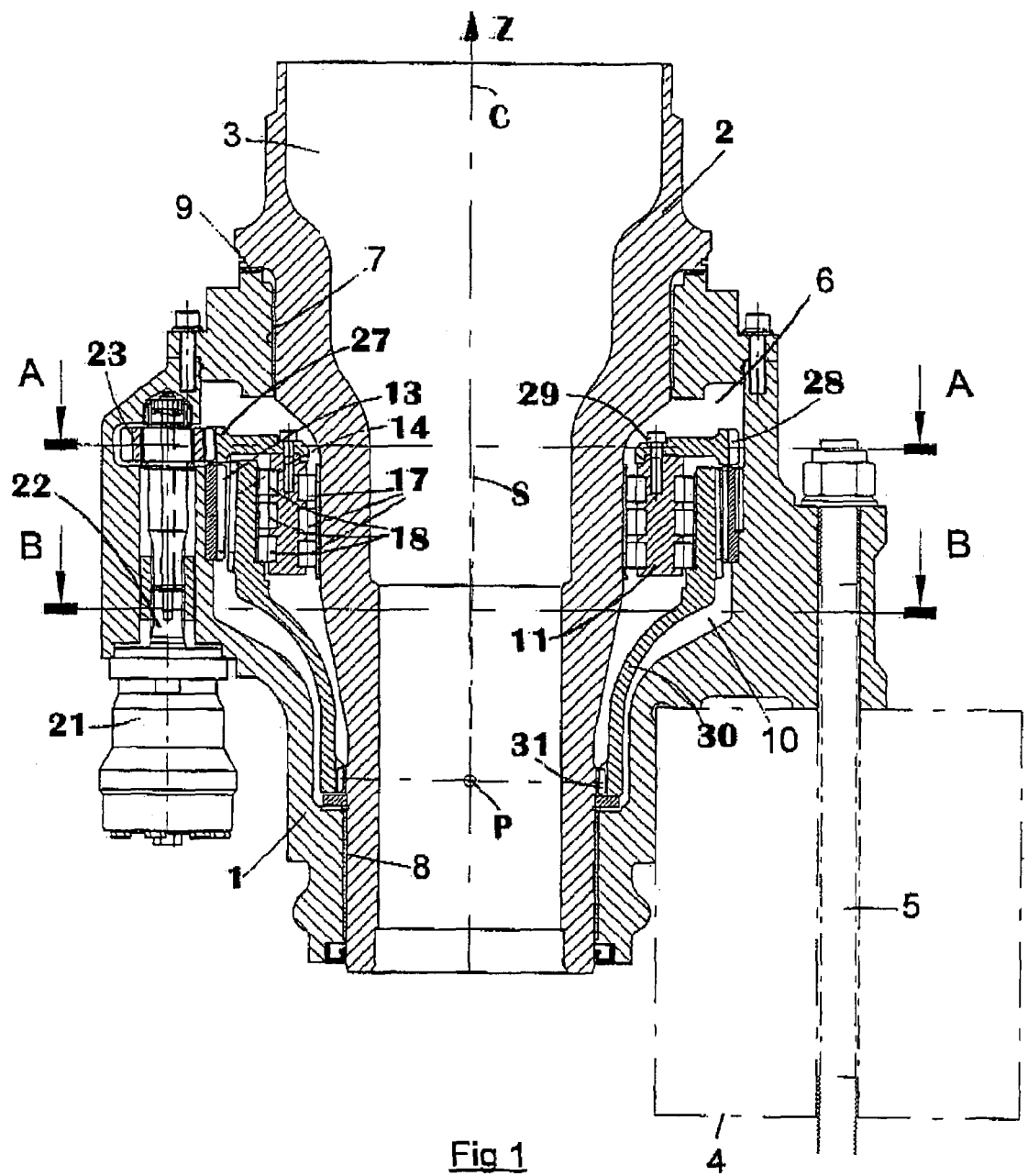

This invention relates to a device intended for slewing the column of a crane of the kind comprising a fastenable crane base in the shape of a house, which is open at the top and at the bottom and in which a lower tubular part of the crane column is rotatably journalled, a power source being connected to the crane column via a power transmission in order to provide for a powered slewing of the crane column around a vertical axis of rotation, and said power transmission including an eccentric gear, which is integrated in the house by being located in an annular space between the outside of the crane column and the inside of the house.

PRIOR ART

Modern cranes, e.g. piece goods cranes for vehicles, are partly made up of a load-carrying column or pillar to which a lifting boom is pivotally connected. In the knuckle boom, or if this is missing, the lifting boom, generally one or more telescopic extensions are journalled. For slewing the crane booms laterally to different angular positions, the crane column is rotatably journalled in a crane base, which is fastenable to a suitable carrier, e.g. the frame of a vehicle. The crane booms may be pivoted vertically by means of hydraulic cylinders supplied with hydraulic oil via hoses or conduits, which are guided trough the column. For this reason at least the lower part of the crane column must be tubular, or hollow. As is described below the slewing of the crane laterally may be provided for in different ways dependent on the size of the cranes.

Small Cranes (0-3 Ton Meter)

Such cranes are generally operated in an electro hydraulic way, the crane column being journalled in two slide bearings. At the bottom of the column there is a gear rim, which, via a transmission, may be driven by means of a manual crank, an electric motor or a hydraulic motor. As the hydraulic hoses and other conduits are to be guided up to the crane booms, there are stop lugs or electric limit switches that restricts the motion of rotation, for instance to the range of ±120-200°. An advantage with such designs is that they do not include any protruding slewing cylinders, thereby permitting the installation of the crane in many alternative ways, e.g. in one corner of a platform body. However, a disadvantage is a low total efficiency in the system of electricity, hydraulic and motor. Worm gears with high quality are considered being too expensive and the cheaper worm gears that are chosen in practice provide mediocre slewing performance and limited working life.

Medium Size Cranes (4-25 Ton Meter)

These cranes are generally hydraulically driven via the power take-off of the vehicle and a hydraulic pump. The common solution uses a gear rack that constitutes a common piston rod in two opposed single-acting hydraulic cylinders. The gear rack is engaged with a cylindrical gear rim at the crane column, which is brought to slew as the gear rack is pressed by one of the cylinders into the other one. The crane column is in general journalled in two slide bearings in a crane base enclosing the lower part of the column, which crane base also includes flanges for the installation of the hydraulic cylinders in the base, the gear rim in most cases being located vertically between the two slide bearings. In this case, the restricted length of stroke of the hydraulic cylinders combined with the pitch diameter of the gear rim compulsorily restricts the angle of rotation of the crane, resulting in that ±180-210° has become the established maximum range of rotation. The restriction of the range of the rotation is, in some applications, a great disadvantage, e.g. as the crane is installed rearmost on a truck frame and is to serve the truck platform as well as a trailer, e.g. in typical Scandinavian timber transports. In some cases the slewing cylinders constitute protruding parts that obstruct other installation details. Provided that a high slewing torque is desirable, e.g. as the crane is to be used even in greatly inclining arrangements (such as at loading of timber in rough terrain) most often double or sometimes quadruple settings of slewing cylinders and gear racks are needed. In such cases these constitute a troublesome factor regarding space, especially if the boom system of the crane is to be folded together and parked transversely to the vehicle when the crane is not in use. The slewing cylinders that interfere the available space lead to the working radius of the boom system being considerably restricted, which in its turn restricts the usefulness of the crane and its competitiveness on the market. The bigger the crane, and the higher demands that are put on the slewing capacity, the bigger the difficulty will be to find acceptable design solutions using gear rack transmissions.

Large Cranes (>25 Ton Meter)

Even large cranes are normally hydraulically powered. However, more advanced bearings for the crane column are used for such cranes, preferably in the form of robust X-roller bearings. In this case there is also an increased demand from the customers that the crane should be infinitely rotatable, something that among other things imply that the guiding of the hoses through the column most be made by means of a multichannel swivel seated in the rotation mechanism. Instead of gear rack transmissions of the abovementioned type the typical design involves a large diameter annular gear integrated with the X-roller bearing and against which one or more motor modules operate, each comprising a hydraulic motor which is combined with a multiple step planetary gear or a conventional multiple-geared transmission. A disadvantage with the known solutions for large cranes is that the components mentioned above are expensive and that the X-roller bearings, in order to provide for good function, require that the connecting components have high rigidity and manufacturing precision. Otherwise, the load will be unevenly distributed to the different rolling elements of the bearing, thus reducing the length of life of the bearing. These requirements as to the rigidity of the X-roller bearing are not easy to combine with the requirement that the installation of the crane base to the frame of the vehicle is to be carried out in such a way that the frame beams are permitted to take part in the suspension of the vehicle, especially in torsion. Moreover, the arrangement will be very space-requiring, in addition the annular gear and the motor modules most often end up in an exposed position, in which they are very sensitive to contaminations and impact damages.

OBJECTIVES AND FEATURES OF THE INVENTION

The present invention aims at obviating the above-mentioned disadvantages of previously known devices for slewing of crane columns and at providing an improved slewing device. Thus, a primary object of the invention is to provide a slewing device, which is compact and therefore does not use too much of the available space in connection with the crane base. Another objective is to provide a slewing device, which is capable of absorbing considerable bending moments and considerable axial and transversal forces of the kind occurring in the lower part of the crane column. Furthermore, the slewing device shall be able to cause a motion of rotation in the speed interval of 10-60°/s having good maneuvering characteristics under the most variable conditions. These conditions include smooth start and stop operations together with a capability of blocking the crane and preventing it from "slewing backwards", as the manoeuvre lever of the crane is set in neutral, even in connection with unforeseeable incidents (e.g. in the case of a hydraulic hose bursting or a power failure). Moreover, the slewing device must be reliable to the extent that, under any operating conditions, it will not cause uncontrollable crane motions, e.g. as a consequence of the formation of air bubbles or vacuum pockets in the hydraulic cylinders (as the torque that the slewing device is about to overcome suddenly may change direction so that the bubble or pocket is compressed by the load or the inertial force of the motion).

According to the invention at least the primary object is attained by means of the features set out in the characterizing clause of claim 1. Furthermore, preferred embodiments of the invention are defined in the dependent claims.

SUMMARY OF THE IDEA OF INVENTION

The invention is based on the general idea that in the house, which forms a crane base and which encloses and journals the lower part of the crane column, there is integrated an eccentric gear mechanism that forms a power transmission between the crane column and a power source installed in the immediate vicinity of the crane base, e.g. a hydraulic or electric motor. The integration of the eccentric gear is provided by the latter being seated in a generally annular space between the outside of the lower part of the crane column and the inside of the house.

The basic principle of eccentric gears—irrespective of the actual embodiment—is based on a co-operation between at least a pair of gear rims having different diameters, one of which present external or outwards directed teeth and therefore being male-like, while the other one has internal or inwards directed teeth, and therefore being female-like. If a high gear reduction is wanted in one step an embodiment is chosen in which the number of teeth in one of the gear rims is different from the number of teeth in the other one by only one or a few teeth. Both gear rims have a rotary symmetrical, e.g. cylindrical or conical basic shape, but the symmetry axis of one of the gear rims is offset or eccentric in relation to the symmetry axis of the other gear rim. Hence, the name "eccentric gear". As the eccentric axis rotates at a specific rotational speed one of the gear rims (e.g. the male gear rim having the smallest diameter) rolls of against the other one and is brought to rotate in opposite direction of rotation, more precisely having a rotational speed, which is reduced in one step and which is dependent on the number of teeth in each gear rim.

In mathematical terms an eccentric gear may be regarded as including three components or quantities having different rotational speeds, namely the female gear rim (e.g. at the inside of a ring), the male gear rim (e.g. the outside of a gear wheel) and the eccentric axis. If these rotational speeds are termed $n_1$, $n_2$ and $n_3$, respectively, and the number of teeth in the female gear rim and the male gear rim, respectively, are termed $z_1$ and $z_2$, respectively, the following mathematical relationship is obtained between the rotational speeds of the components:

$$n_2 = n_1 * \frac{z_1}{z_2} - n_3 * \frac{z_1 - z_2}{z_2}$$

The number of teeth may, for instance, amount to: $z_1=50$ and $z_2=49$, respectively. In a common case the female gear rim is stationary, i.e. $n_1$ is chosen to be 0, at the same time as the eccentric axis is operated with the rotational speed of $n_3$ and the outgoing motion $n_2$ is taken out as an extremely reduced rotation of the male gear rim in opposite direction via a coupling.

BRIEF DESCRIPTION OF THE APPENDED DRAWINGS

Figure 2:
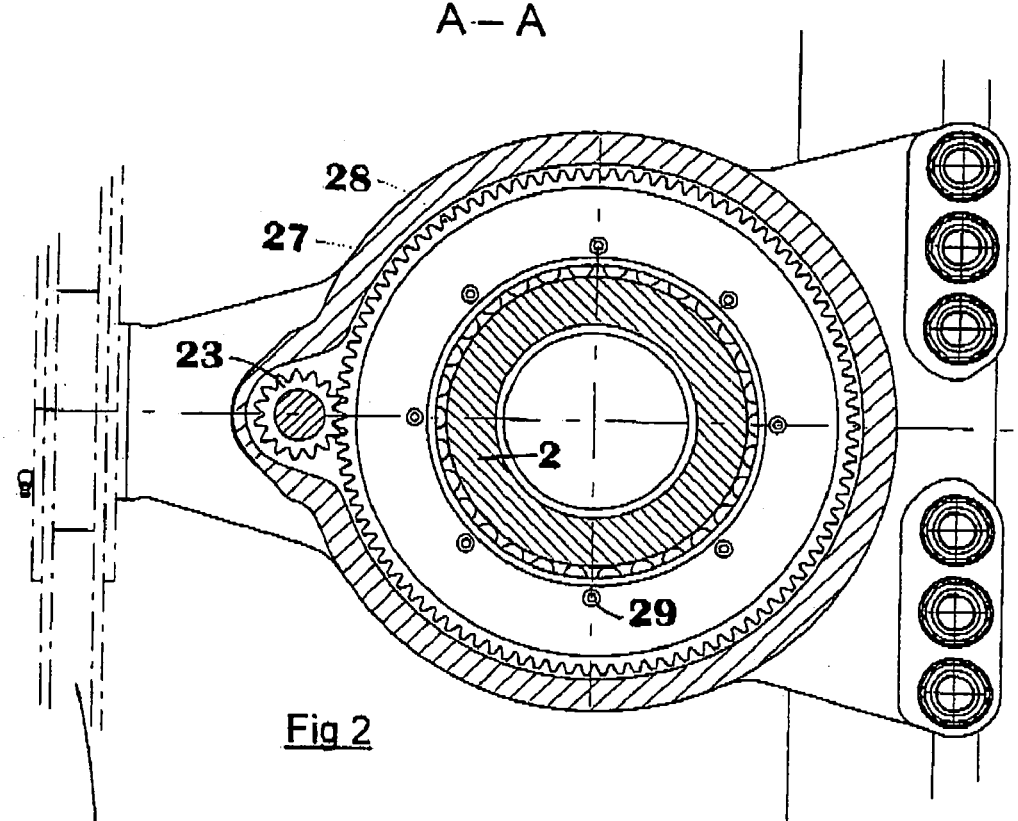
Figure 3:
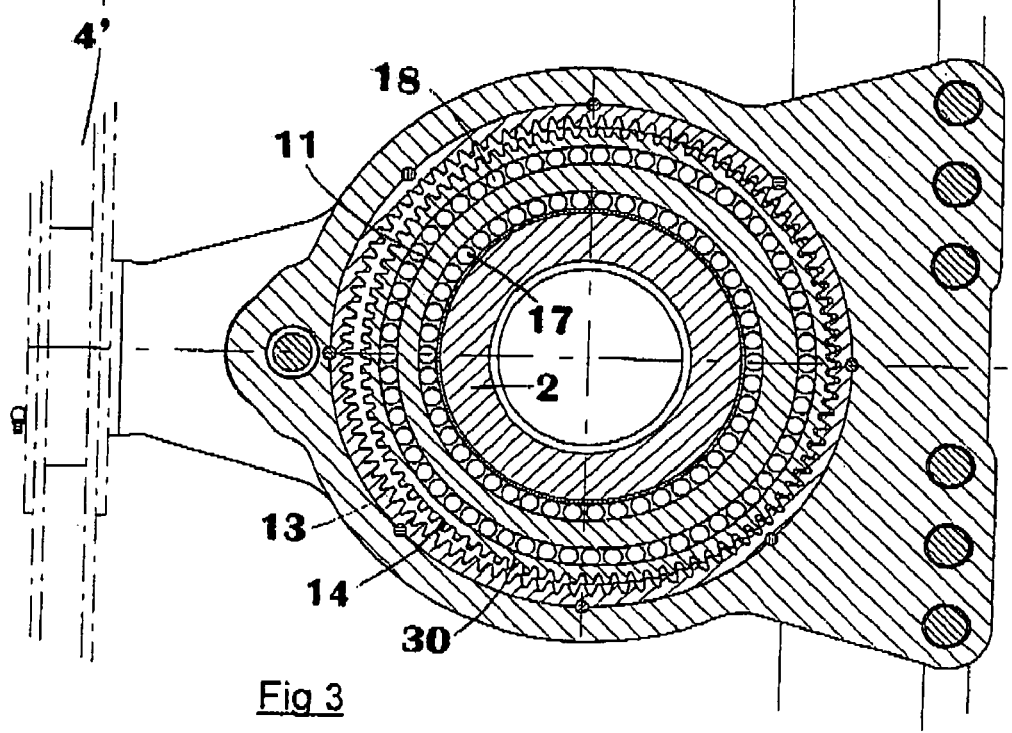
Figure 4:
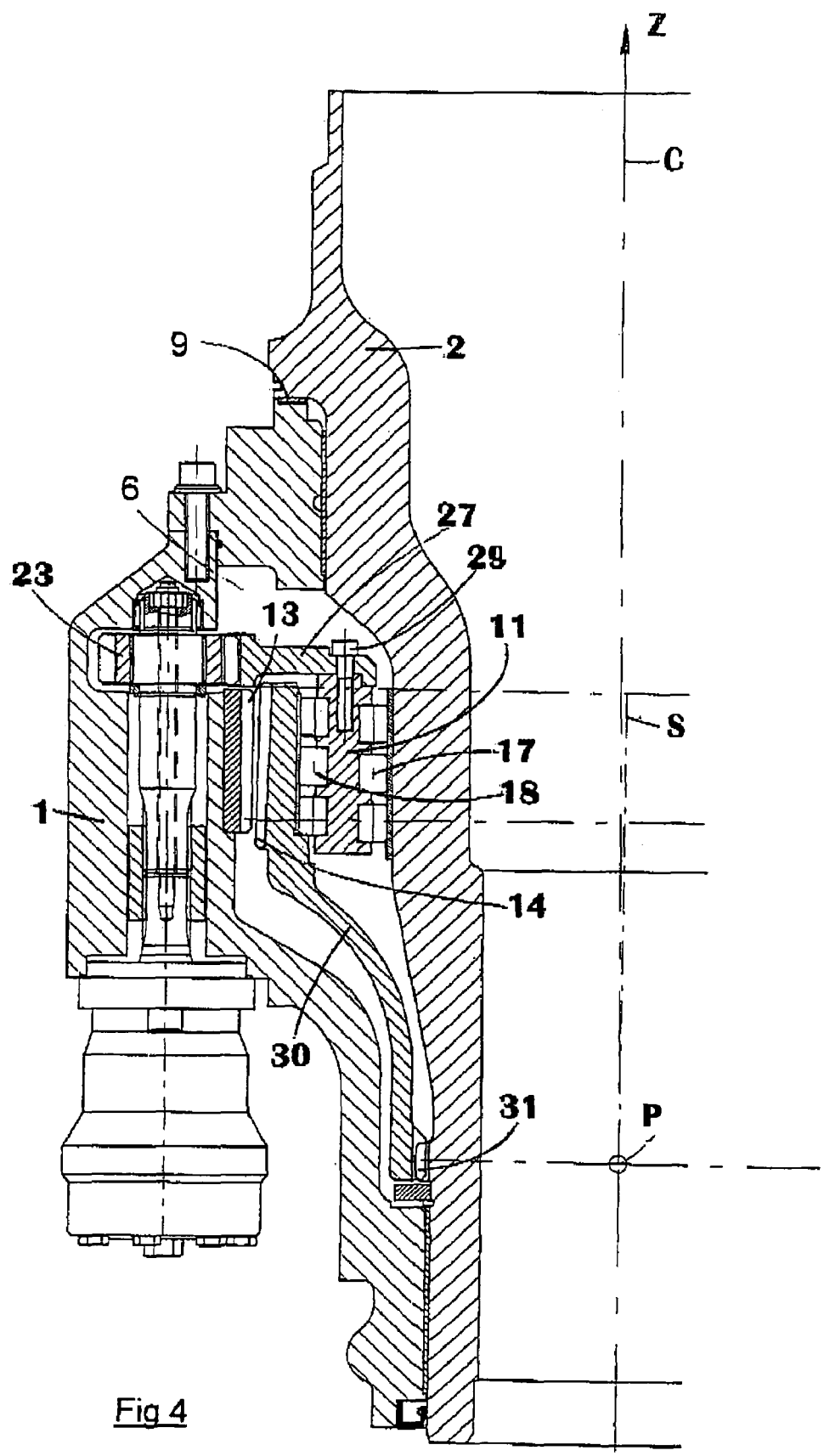

In the drawings:

FIG. 1 is a vertical section through a crane base and a lower part of a crane column that is rotatably journalled in relation to the crane base, together with an eccentric gear mechanism according to the invention arranged between the base and the column, FIG. 2 is a section A-A in FIG. 1, FIG. 3 is a section B-B in FIG. 1, and FIG. 4 is an enlarged segment of the leftmost half of the section in FIG. 1.

DETAILED DESCRIPTION OF PREFERRED EMBODIMENTS OF THE INVENTION

In FIG. 1, 1 generally designates a crane base constituted by a house which is open at the top as well as at the bottom, in which house a lower part 2 of the crane column is rotatably journalled. In order to achieve terminological simplicity the detail 2 is hereafter named merely crane column. In general the detail 2 is tubular having rotary symmetrically shaped out—and insides, the pipe wall defining a through duct 3 through which hydraulic hoses, electric cables, etc. may be guided up to the crane booms carried by the column and the hydraulic cylinders of the crane booms. The house 1 serving as a crane base is fastenable to a carrier schematically indicated by 4, which for instance may consist of a transverse beam that together with the longitudinal frame members are connected to a wheel-carried vehicle. Advantageously, the fastening of the house may be done by means of a screw joint 5. Provided that a larger crane will be installed on a truck, a second beam is added for the installation, normally in the shape of a so called three point bridge, e.g. in the position 4' in FIGS. 2 and 3.

Between the outside of the crane column 2 and the inside of the house 1 there is defined a gaplike space 6, which is annular in so far that the space in question is endless. Some of the surfaces that define the space in question have additionally at least partly rotary symmetrical, for instance cylindrical, shapes.

In the shown embodiment the crane column 2 is journalled in relation to the house 1 via three different bearings, viz. two axially separated radial bearings 7, 8 together with a thrust bearing 9. In the example these bearings are shown as slide bearings, but in practice each separate bearing may, for instance, be constituted by a roller or needle bearing, all depending on the required performance of the total slewing device.

In the existing annular space 6 between the two radial bearings 7, 8 there is, according to the invention, arranged an eccentric gear mechanism according to the invention, generally designated with 10.

The eccentric gear mechanism includes a sleeve 11, hereinafter named eccentric sleeve. This eccentric sleeve 11 is journalled direct on the outside of the column 2 and connected to an output shaft 22 of a power source 21 via a primary pinion 23 as well as a gear wheel 27 having an external gear rim 28, which is engaged with the primary pinion 23. In the example, the gear wheel 27 is connected to the sleeve 11 via a screw joint 29. More precisely, the sleeve 11 is journalled to the column 2 via internally located roller elements 17, which jointly form a geometrically cylindrical bearing, which is concentric with a main axis of rotation C of the crane column 2. However, on its outside the sleeve 11 present a bearing which is formed by the roller elements 18 and having a cylindrical basic shape as regards geometry, and which, however, is eccentrically located and additionally slightly leaning in relation to the axis C, i.e. the symmetry axis of the bearing is offset and leans in relation to the axis C. More precisely the bearing centre of the roller elements 18 is concentric to the axis S, which is described below. A funnel-shaped pipe coupling 30 interacts with the eccentric sleeve 11, (see FIG. 4) said coupling, by reasons explained below, hereinafter being named "nutation pipe". The nutation pipe 30 is connected to the column 2 via a coupling designated 31 in such a way that the nutation pipe is able to obtain a nutating motion around an apex point designated P (a generatrix, which travels along an envelope surface of an imaginary cone, obtains a nutating motion at which the apex of the generatrix is the point of the cone). The symmetry axis of the nutation pipe 30 is designated S.

Two interacting gear rims 13, 14 are connected to the house 1 as well as the nutation pipe 30. More precisely a female gear rim 13 is formed on the inside of the house 1. In the example, this gear rim has a straight cylindrical basic shape, the symmetry axis of the gear rim coinciding with the main axis of rotation C. The male gear rim 14 is in turn connected to or integrated with the nutation pipe 30. More precisely the male gear rim 14 is formed on the outside of the upper part of the nutation pipe having the largest diameter and being rotary symmetric around the axis S, but showing a varying top diameter and a varying addendum modification along the axis S, e.g. as described in SE 501 463.

The coupling 31, the purpose of which is to convey the torque to the column 2, as well as to neutralize the small angular motions of the nutation, is in the example formed by a cambered spline coupling of known type. As a coupling for this purpose also other solutions may be used, e.g. a conventional universal joint, a Rzeppa joint or a coupling of the kind described in SE 9404154-8.

When the motor is activated, e.g. in such a way that the eccentric sleeve 11 is brought to rotate clockwise, the nutation pipe 30 will receive a substantially reduced nutating motion in the counter clockwise direction. The nutation pipe 30, in this way rotating around the nutating symmetry axis S, conveys, via the coupling 31, its rotational motion to the crane column 2. In the example the gear reduction between the output shaft 22 of the motor 21 and the eccentric sleeve 11 is about 5.5:1. The female gear rim 13 includes 47 teeth in the example, while the male gear rim 14 includes 46 teeth. Hereby, in this step, is achieved a gear reduction of 46:1. The total gear reduction between the output shaft of the motor and the column 2 is therefore 5.5*46=253:1. Thus, if the motor is operated at 800 rpm the column 2 will obtain a speed of rotation of 800/253*360/60=19°/s.

In the example the power source 21 is a hydraulic motor, although other power sources are conceivable, e.g. electric motors. By means of the motor 21 the eccentric sleeve 11, via the primary pinion 23 and the gear wheel 27, can be run in either of the two opposite rotary directions, i.e. clockwise or counter-clockwise.

A considerable advantage of the described slewing device is that the device may slew the column slowly (10-60°/s) in relation to the house under conveying a large torque to the column. This is feasible while the column is loaded by a large bending moment and an axial force which, in this context, is moderate. Another essential advantage is that the slewing device by being integrated in the house forming the crane base, is extremely compact and permits itself to be operated by means of a power source, which in turn requires an extremely small space.

FEASIBLE MODIFICATIONS OF THE INVENTION

The invention is not restricted by the embodiment described above and shown in the drawings. Thus, the straight cylindrically cut female teeth 13 may be designed having a top diameter and addendum modification varying along the height, in order to interact in an optimal way with the profile of the male teeth 14, adapted for these conditions. Further the bearing of the crane column in the crane base may be modified in multiple ways within the scope of the invention. For instance it is conceivable that instead of the plain bearings 7, 8 use ball bearings, needle bearings, cylindrical or conical roller bearings. Another alternative is a X-roller bearing in the position 7, possibly in combination with at least one radial bearing axially separated from the latter, which radial bearing may be formed by, for instance, a needle bearing in position 8. The most suitable choice is determined from the desired performance and the space limitations for the actual embodiment together with the manufacturing cost factors.

The invention claimed is:

1. A device for slewing a column of a crane, comprising:
    a fastenable crane base defined by a housing (1) that is open at the top and at the bottom and having a lower tubular part that is adapted to rotatably receive a crane column,
    a power source (21) that is connectable to the crane column via a power transmission in order to provide for a powered slewing of the crane column around a center line of the crane base, said power transmission including an eccentric gear (10), which is integrated with the housing (1) and located in an annular space (6) in the housing (1), and
    a bearing that includes two axially separated radial force absorbing bearings (7, 8) and an axial force absorbing bearing (9),
    wherein the eccentric gear (10) comprises an eccentric sleeve (11) rotated by means of the power source (21) and having rotary symmetric out—and insides, the symmetry axes of which are eccentrically displaced in relation to each other and have a mutual angular displacement so that they converge in an apex point (P) within the crane base and adjacent to or on the center line of the crane base.

2. A device according to claim 1, wherein the eccentric sleeve (11) is rotatably journalled having its inner symmetry axis concentric with the center line of the crane base, and wherein the outside of the sleeve is eccentric in relation to the center line and internally journalled in a pipe coupling (30) having an external male gear rim (14) having a specific number of teeth, one or just a few of which are engaged with a female gear rim (13) connected to the housing (1), the latter rim being concentric with the center line and comprising a different number of teeth compared to the male gear rim (14), the pipe coupling (30) being nutationally movable around the apex point (P) which is axially separated from the eccentric sleeve (11), at which point the pipe coupling is connectable to the crane column via a coupling (31) that is capable of absorbing the nutating motion of the pipe coupling, as well as conveying the slewing torque.

3. A device according to claim 2, wherein the coupling (31) is constituted by a cambered spline coupling.

* * * * *